April 15, 1969   K. N. LAMBERT ET AL   3,439,230
ELECTROLYTIC CAPACITOR AND FILTER NETWORK
Filed Aug. 25, 1965

INVENTORS
Kermit N. Lambert
Richard C. Peterson
BY *Connolly and Hutz*
ATTORNEYS __United States Patent Office__

3,439,230
Patented Apr. 15, 1969

3,439,230
ELECTROLYTIC CAPACITOR AND
FILTER NETWORK
Kermit N. Lambert, Williamstown, and Richard C. Peterson, North Adams, Mass., assignors to Sprague Electric Company, North Adams, Mass., a corporation of Massachusetts
Filed Aug. 25, 1965, Ser. No. 482,506
Int. Cl. H01g 9/00, 1/16, 1/00
U.S. Cl. 317—230                    2 Claims

ABSTRACT OF THE DISCLOSURE

A pair of input terminals connected to respective electrodes of the capacitance section extend from one end of the capacitor and a pair of output terminals connected to the respective electrodes extend from the other end to provide a capacitive unit having lowered impedance and inductance.

---

This invention relates to a fixed electrolytic capacitor and filter network.

In conventional electrolytic capacitors the effective series resistance (ESR) of the capacitor is made up of the various contributing resistances: series plate resistance, parallel dielectric resistance, and series conductor and connection resistances between the plates, the terminals, and other parts of the circuit in which the capacitor is used. Similarly, the effective series inductance (ESL) of the capacitor is made up of the various contributing inductances: series plate inductances, and series conductor inductances between the plates, the terminals, and other parts of the circuit in which the capacitor is used.

In most capacitor applications it is desirable to keep the ESR and ESL as low as possible. This is usually accomplished by using short and heavy conductors. Correspondingly, the degree of importance attached to each of the above-mentioned contributing resistances and inductances varies with the type of capacitor and its application.

An object of this invention is to provide a capacitor in which the effects of the plate-to-terminal and terminal-to-circuit resistances and inductances are reduced or eliminated.

A further object is to provide a novel filter network having lower impedance and reduced ripple.

Novel features and advantages of the present invention will become apparent to one skilled in the art from a reading of the following description in conjunction with the accompanying drawings wherein similar reference characters refer to similar parts and in which.

In general, this invention involves connecting a pair of terminals to each electrode of a capacitor, and extending these terminals from opposite ends of the capacitor whereby the capacitor has a total of four terminals, rather than the conventional two.

Figure 1:
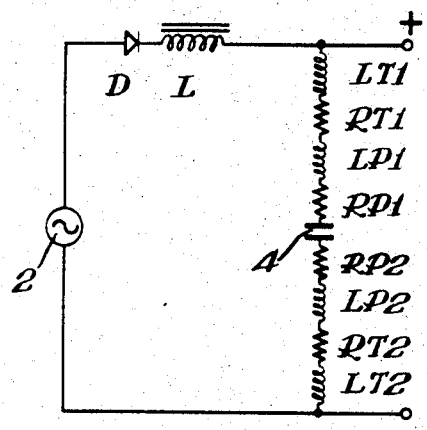
FIG. 1 is a schematic of a circuit containing a conventional capacitor.

A conventional two terminal capacitor is schematically shown in FIG. 1. As indicated therein, a low frequency rectified power supply 2 is connected to a conventional two terminal capacitor 4. In certain applications, particularly low impedance low frequency power supplies, the total ESR is made up of the resistance $RT1+RT2$ (resistances due to the conductors between the plates, and the terminals and the connections thereto), as well as the resistance $RP1+RP2$ (resistance due to plates). Correspondingly, the total ESL is made up of the terminal and plate inductances, $LT1+LT2+LP1+LP2$. The total ESR and ESL accordingly includes resistance and inductance both internal and external to the capacitor, which are in shunting arrangement to the circuit load and thus have considerable bearing on the magnitude of the "ripple" ($Vac/Vdc$) in the DC output of the power supply.

Figure 2:
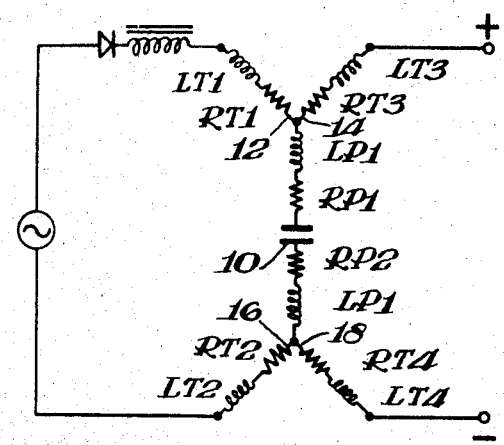
FIG. 2 is a schematic of a corresponding circuit containing a capacitor formed in accordance with this invention.

FIG. 2 schematically shows a capacitor formed in accordance with this invention. As indicated therein the capacitor 10 has a pair of terminals 12, 14 connected to one electrode, and a second pair of terminals 16, 18 connected to the other electrode. Advantageously, the total ESR and ESL from the four terminal capacitor shown in FIG. 2 is substantially lower than that of FIG. 1. For example with the arrangement of FIG. 1 the AC voltage is developed across $RT1+RP1+RP2+RT2$, and appears in the DC output of the power supply as ripple voltage. In FIG. 2, however, the "ripple" voltage which appears at the load is only that developed across $RP1+RP2$ since RT1 and RT2 are now effectively in series with the load. Correspondingly the inductances LT1 and LT2 are effectively in series with the load so that the impedance of the unit (determined now by $LP1+LP2$) remains uniform to frequencies in excess of one megacycle.

Tests run on conventional 2-terminal capacitors, as compared with substantially identical 4-terminal capacitors, indicates that the ESR of the 2-terminal capacitors are as much as 170% higher than the ESR of like 4-terminal capacitors. Since the ripple voltage of the power supplies in which these capacitors are used is approximately proportional to the ESR, the ripple voltage of a power supply using a conventional 2-terminal capacitor will accordingly also be as much as 170% higher than the ripple voltage of a power supply with a 4-terminal capacitor in accordance with this invention.

FIG. 1 schematically shows the resistances, inductances, and capacitance of a capacitor 4 whose insulation resistance of dielectric is assumed to have negligible effect on the ESR. As shown in FIG. 1 RP1 and RP2 are the resistances due to the plates, while RT1 and RT2 are the resistances due to the conductors between the plates and the terminals and the connections thereto. Although the conductor and the connection resistances between the terminals and the circuit are not shown, they can be considered an extension of RT1 and RT2.

As also shown in FIG. 1, LP1 and LP2 are the inductances due the plates or electrodes, and LT1 and LT2 are the inductances due to the conductors between the plates and the terminals. Correspondingly, although the conductor inductances between the terminals and the circuit are not shown, they can also be considered extensions of LT1 and LT2.

FIG. 2 is similar to FIG. 1 but differs in that the capacitor 10 of FIG. 2 is formed in accordance with this invention, having a pair of terminals 12, 14 and 16, 18 connected to each plate. For the sake of simplicity it is assumed that the resistance associated with each individual lead equals that of any other lead such that $RT1=RT2$ of FIG. 1 equals $RT1=RT2=RT3=RT4$ of FIG. 2, and similarly the resistance associated with each plate are assumed equal such that $RP1=RP2$ of FIG. 1 equal $RP1=RP2$ of FIG. 2. When the capacitors formed in accordance with this invention are used in certain applications, it is noted that no RT-type resistances are present in the branch which shunts the output or circuit load.

Correspondingly for the sake of simplicity, it is assumed that $LT1=LT2$ of FIG. 1 equals $LT1=LT2=LT3=LT4$ of FIG. 2, and $LP1=LP2$ of FIG. 1 equals $LP1=LP2$ of FIG. 2. Likewise when capacitors formed in accordance with this invention are used in certain applications no LT-type inductances are present in the shunting branch.

It is also further assumed that C of FIG. 1=C of FIG. 2 for similar capacitors.

As indicated above the resistances and inductances between the capacitor terminals and the circuit in which the capacitor is used is not shown in FIGS. 1–2. These resistances and inductances, however, are of considerable importance in certain applications. With the four-terminal capacitors of this invention, the effect of external circuit resistances and inductances are reduced, as well as the effect of internal capacitor resistances and inductances.

At low frequencies the inductances are negligible compared to the resistances. In certain high frequency applications, however, the total ESL made up of the inductances above, including inductances internal and external to the capacitor, has considerable bearing on the operation of the circuit. This is so because any inductance in series with the capacitance will result in a higher value of effective capacitance. ($C\textit{eff}=Co/1-\omega^2 LC$.) Accordingly in these cases the use of the four terminal capacitor is increasingly important because of its reduction of inductance effect.

Figure 3:
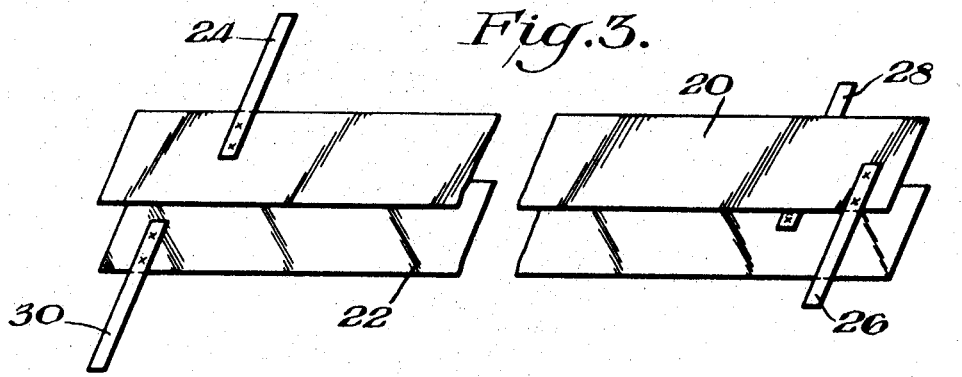
FIG. 3 is a plan view of a pair of unrolled capacitor plates having dual leads in accordance with this invention.

FIG. 3 shows a pair of unrolled capacitor plates 20, 22 illustrating a possible terminal configuration. As indicated therein each pair of terminals are laterally spaced with terminals 24, 26 connected near the extremes of one plate 20 while a second pair of terminals 28, 30 are similarly connected to the other plate 22. A capacitor 32, not shown, is formed by rolling the plates with interposed porous layers, and impregnating the unit with a conventional electrolyte. The leads of each plate are brought out opposite ends of the unit to reduce lead inductance and provide convenient circuit connections, thus terminal 24 of electrode 20 and terminal 28 of electrode 22 extend from one end to provide input terminals and terminals 26, 30 of the respective electrodes are brought out the other end of the structure to provide output terminals.

In this embodiment, the leads are spaced near the ends of each plate, however, many other configurations are useful. In any event, the electrode between the dual terminals must be of low resistivity material if additional circuit series resistance is to be avoided. The terminals, for example, may be only slightly separated when convenient. Furthermore, the terminals need not be joined at corresponding points of each plate, but may be displaced from one another, although a large displacement of corresponding terminals may introduce inductive effects.

Figure 4:
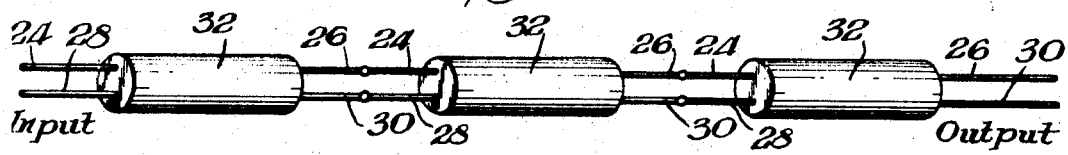
FIG. 4 is a perspective view of three, four-terminal capacitors, formed in accordance with this invention, in cascade connection to one another.

FIG. 4 illustrates a further embodiment of this invention wherein three identical capacitors 32, of the type described above and having electrodes as illustrated in FIG. 3, are shown in cascade connection. Thus output terminals 26, 30 of a first capacitor 32 are connected to input terminals 24, 28 of a second capacitor 32 and output terminals 26, 30 of this capacitor are similarly connected to the input of a third capacitor. In FIG. 4 three identical capacitors are shown, however, it should be understood that any number of various types could be connected in this manner.

The circuit arrangement shown provides a considerable reduction in output impedance or attenuation, far exceeding that experienced when conventional capacitors, having single anode and cathode terminals, are parallel connected. Each capacitor provides a successive reduction in the ripple of the preceding capacitor so that exceptional filtering results. Accordingly, the novel use of four terminals permits the plugging in of any number of units to achieve a desired filtering. Three capacitors are shown although in many applications two will be sufficient.

Additional modifications or circuit configurations may also be useful. For example, where an application will not permit the use of a break in the ground side of the circuit, the capacitor may be employed as a three terminal device by connecting together the terminals from one of the plates. It should be obvious, however, that this will not provide as efficient filtering as the use of the four terminals, as indicated earlier.

Obviously, many modifications and variations of the present invention are possible in the light of the above teachings. It is therefore to be understood that within the scope of the appended claims the invention may be practiced otherwise than as specifically described.

What is claimed is:

1. An electrolytic capacitor comprising a pair of electrodes, at least one of said electrodes having a valve-metal oxide thereon, an electrolyte disposed between said electrodes in contact therewith, and at least two terminals connected to and extending from each of said electrodes at locations spaced apart by substantially less than the whole length of said electrodes, one terminal from each of said electrodes extending from one end of said capacitor, the other terminal from each of said electrodes extending from the other end of said capacitor, and the electrode material between the terminals of each of said electrodes being of low resistance material.

2. A filter network comprising a plurality of electrolytic capacitors, each of said capacitors having a pair of input terminals extending from one end thereof and a pair of output terminals extending from the other end thereof, one of said input terminals connected to one electrode and the other of said input terminals connected to the other electrode of said capacitor, one of said output terminals connected to said one electrode and the other of said output terminals connected to said other electrode, terminals of each electrode being disposed at locations spaced apart by substantially less than the whole length of said electrode, and said capacitors connected in cascade arrangement wherein the output terminals of a preceding capacitor are separately connected to the input terminals of a succeeding capacitor.

References Cited

UNITED STATES PATENTS

| | | | |
|---|---|---|---|
| 1,924,606 | 8/1933 | Hammond | 317—231 |
| 2,841,771 | 7/1958 | Dunleavey | 317—230 |
| 2,884,605 | 4/1959 | Dubilier | 317—260 |
| 3,020,453 | 2/1962 | Hogue | 317—230 |
| 3,346,783 | 10/1967 | Millard | 317—230 |

JAMES D. KALLAM, *Primary Examiner.*

U.S. Cl. X.R.

317—231, 260